United States Patent
Levy

(10) Patent No.: US 10,878,674 B2
(45) Date of Patent: Dec. 29, 2020

(54) ENERGY EFFICIENT SEISMIC INTRUSION DETECTION

(71) Applicant: SensoGuard Ltd., Modi'in Region Insdustrial Park (IL)

(72) Inventor: Tomer Levy, Modi'in Region Industrial Park (IL)

(73) Assignee: SENSOGUARD LTD., Shoham (IL)

( * ) Notice: Subject to any disclaimer, the term of this patent is extended or adjusted under 35 U.S.C. 154(b) by 0 days.

(21) Appl. No.: 16/683,999

(22) Filed: Nov. 14, 2019

(65) Prior Publication Data
US 2020/0160678 A1 May 21, 2020

(30) Foreign Application Priority Data
Nov. 16, 2018 (IT) .................. 102018000010407

(51) Int. Cl.
| E05B 45/06 | (2006.01) |
| G08B 13/16 | (2006.01) |
| G01V 1/00 | (2006.01) |
| G01V 1/16 | (2006.01) |
| G01V 1/18 | (2006.01) |

(Continued)

(52) U.S. Cl.
CPC ......... *G08B 13/1663* (2013.01); *G01V 1/001* (2013.01); *G01V 1/166* (2013.01); *G01V 1/18* (2013.01); *G01V 1/30* (2013.01); *G08B 25/00* (2013.01); *G01V 2210/1429* (2013.01); *G01V 2210/6161* (2013.01); *G01V 2210/65* (2013.01)

(58) Field of Classification Search
CPC .......................... G08B 13/1663; G01V 1/166; E05B 19/0771; E05B 15/1635

USPC .......... 340/566, 518, 522, 534, 539.22, 541, 340/561, 8.1, 542, 686.1, 686.2, 687, 340/5.32, 5.33, 10.4; 70/278.2, 432, 433
See application file for complete search history.

(56) References Cited

U.S. PATENT DOCUMENTS

| 5,684,458 A | 11/1997 | Calvarese |
| 5,870,022 A | 2/1999 | Kuhnly et al. |

(Continued)

FOREIGN PATENT DOCUMENTS

WO 2017048347 A1 3/2017

OTHER PUBLICATIONS

Chaitanya et al.; "Design of Low Noise Amplifier for Seismic Signals", International Journal of Advance Engineering and Research Development vol. 4, Issue 12 pp. 21-26. (2017).

(Continued)

*Primary Examiner* — Tai T Nguyen
(74) *Attorney, Agent, or Firm* — Novick, Kim & Lee, PLLC; Jae Youn Kim

(57) ABSTRACT

Methods and a device for detecting physical intrusion are providing, the device including a vibration sensor, a processor, a transmitter, a battery, and a conductive wire connecting the vibration sensor and the processor. The vibration sensor is affixed to a first part of the device, and the processor, transmitter, and battery are affixed to a second part of the device. The first and second parts, when attached together, form a case containing the conductive wire. The device performs steps of: sampling a set of seismic signals from the vibration sensor, determining that the set of seismic signals matches a seismic threat pattern, and responsively issuing an intrusion alert.

18 Claims, 5 Drawing Sheets

(51) Int. Cl.
　　　*G01V 1/30*　　　(2006.01)
　　　*G08B 25/00*　　　(2006.01)

(56) References Cited

U.S. PATENT DOCUMENTS

| | | | | |
|---|---|---|---|---|
| 8,781,292 B1* | 7/2014 | Ross | ............ | H04N 5/765 386/223 |
| 2008/0191871 A1* | 8/2008 | Horak | ............ | G08B 13/1663 340/566 |
| 2010/0085188 A1 | 4/2010 | Herdic et al. | | |
| 2013/0249691 A1* | 9/2013 | Bertoni | ............ | G08B 13/02 340/541 |

OTHER PUBLICATIONS

Bohlen et al.; "Towards an automatic seismic localization of human footsteps" Near Surface Geophysics 11, pp. 317-323. (2013).
Koc et al. ;"Hardware Design of Seismic Sensors in Wireless Sensor Network" International Journal of Distributed Sensor Networks. 8 pages. (2013).

\* cited by examiner

ENERGY EFFICIENT SEISMIC INTRUSION DETECTION

CROSS-REFERENCE TO RELATED APPLICATIONS

This application claims priority under 35 U.S.C. 119 and 365 to Italian Patent Application No. 102018000010407, filed Nov. 16, 2018, the contents of which are incorporated herein by reference.

FIELD OF THE INVENTION

The invention generally relates to physical intrusion detection and in particular to detecting intrusion via underground seismic sensors.

BACKGROUND

Various methods are known for protecting a restricted area against physical intrusion and for providing alerts or alarms if an intruder trespasses into the area. One method includes burying vibration sensors ("seismic sensors," i.e., sensors detecting vibrations in the earth) around the perimeter of the area. The buried sensors pick up vibrations of the earth, such as may be caused by vehicles or footsteps.

However, providing power to buried vibration sensors may be problematic. If power is provided by a buried cable means, installation costs are higher and damage to the cable may be difficult to locate and can incapacitate the system. Powering by battery reduces installation costs but incurs additional maintenance costs for tracking battery lifetimes and for providing battery replacements. A system that can reduce maintenance requirements has multiple benefits, including reduced costs and greater system reliability. In particular, reducing the energy consumption of battery powered buried devices has clear benefits.

SUMMARY

Embodiments of the present invention provide systems and methods for energy efficient physical intrusion detection, in particular for detecting intrusion via an underground device.

In some embodiments, a device is provided for physical intrusion detection, including a vibration sensor, a processor, a transmitter, a battery, and a conductive wire. The conductive wire connects the vibration sensor and the processor, transmitting seismic signals from the vibration sensor to the processor. The vibration sensor is affixed to a first part of the device, and the processor, transmitter, and battery are affixed to a second part of the device. The first and second parts, when attached together, form a case containing the conductive wire. According to the length of the conductive wire the first and second parts when separated may be buried at different depths. A memory of the device includes computer-readable instructions that when executed by the processor cause the processor to perform steps of: sampling a set of seismic signals from the vibration sensor; determining that the set of seismic signals matches a seismic threat pattern; and responsively issuing an intrusion alert.

In further embodiments, the conductive wire is between 5 cm and 3 meters in length. The device may include additional vibration sensors, connected by additional respective conductive wires to the processor and affixed to additional, separable parts of the device. In some embodiments, determining that the set of seismic signals matches a seismic threat pattern comprises determining that a vibration level is greater than a predetermined vibration threshold. Sampling the set of seismic signals may include: sampling according to a first precision setting including parameters of sampling frequency, sampling resolution, and oversampling rate.

Determining that the set of seismic signals matches a seismic threat pattern may include performing the steps of: calculating a representative vibration level of the set of seismic signals; determining that the vibration level is greater than a predetermined vibration threshold and responsively changing the first precision setting to a second precision setting by increasing at least one of the parameters of the sampling frequency, the sampling resolution, and the oversampling rate; sampling, according to the second precision setting, a second set of seismic signals from the vibration sensor for a predetermined second sampling time period; comparing the second set of seismic signals to one or more stored seismic threat patterns; and responsively to determining a match between the second set of seismic signals and one or more of the stored seismic threat patterns, issuing the intrusion alert. The processor may be further configured, after issuing an intrusion alert, to determine that a subsequent set of seismic signals does not match a stored seismic pattern and responsively to restore the first precision setting and continuing to test seismic signals. Restoring the first precision setting, after issuing an intrusion alert, may include decreasing the vibration threshold for a post-alarm time period.

Issuing the intrusion alert may include issuing a signal over the transmitter to a remote alarm controller.

Further embodiments of the present invention provide a device for physical intrusion detection, comprising a vibration sensor, a processor, and a memory communicatively coupled to the at least one processor, the memory comprising computer-readable instructions that when executed by the at least one processor cause the processor to perform steps of: sampling a first set of seismic signals from the vibration sensor, according to a first precision setting comprising parameters of sampling frequency, sampling resolution, and oversampling rate; calculating a representative vibration level of the first set of seismic signals; determining that the vibration level is greater than a predetermined vibration threshold and responsively changing the first precision setting to a second precision setting by increasing at least one of the parameters of the sampling frequency, the sampling resolution, and the oversampling rate; sampling, according to the second precision setting, a second set of seismic signals from the vibration sensor for a predetermined second sampling time period; comparing the second set of seismic signals to one or more stored seismic threat patterns; performing one of (1) issuing an intrusion alert, responsively to determining a correlation between the second set of seismic signals and the one or more stored seismic threat patterns, and (2) restoring the first precision setting and continuing to test seismic signals, responsively to determining no correlation.

In some embodiments, comparing the second set of seismic signals to the one or more stored seismic threat patterns includes filtering out noise from one or more of the seismic signals of the second set.

Determining there is a correlation may include determining a distance to a seismic vibration source, and issuing the intrusion alert comprises issuing an alert including a location and a probable intrusion. Alternatively or additionally, determining there is a correlation may include determining a correlation between the second set of seismic signals and each of the one or more stored seismic threat patterns and comparing each respective correlation with a preset probability threshold defining a minimum correlation for a match.

Sampling the first set of seismic signals may include sampling 15 to 100 samples and the second sampling time period is 5 to 30 seconds. Responsively to determining no correlation, the processor may increase the vibration threshold for a post-event time period. Responsively to determining a correlation, the processor may decrease the vibration threshold for a post-alarm time period. Calculating the vibration level may include calculating a root mean square (RMS) value of the set of signals. Restoring the first precision setting may include gradually decreasing, over a period of time, one or more precision setting parameters until the parameters equal those of the first precision setting.

Further embodiments of the present invention provide a method for detecting physical intrusion, implemented on at least one processor having at least one memory communicatively coupled to the at least one processor and comprising stored computer-readable instructions that when executed by the at least one processor cause the system to perform the method of: sampling a first set of seismic signals from a vibration sensor, according to a first precision setting comprising parameters of sampling frequency, sampling resolution, and oversampling rate; calculating a representative vibration level of the first set of seismic signals; determining that the vibration level is greater than a predetermined vibration threshold and responsively changing the first precision setting to a second precision setting by increasing at least one of the parameters of sampling frequency, the sampling resolution, and the oversampling rate; sampling, according to the second precision setting, a second set of seismic signals from the vibration sensor for a predetermined second sampling time period; comparing the second set of seismic signals to one or more stored seismic threat patterns; and performing one of (1) issuing an intrusion alert, responsively to determining a correlation, and (2) restoring the first precision setting and continuing to test seismic signals, responsively to determining no correlation.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DETAILED DESCRIPTION

Figure 1:
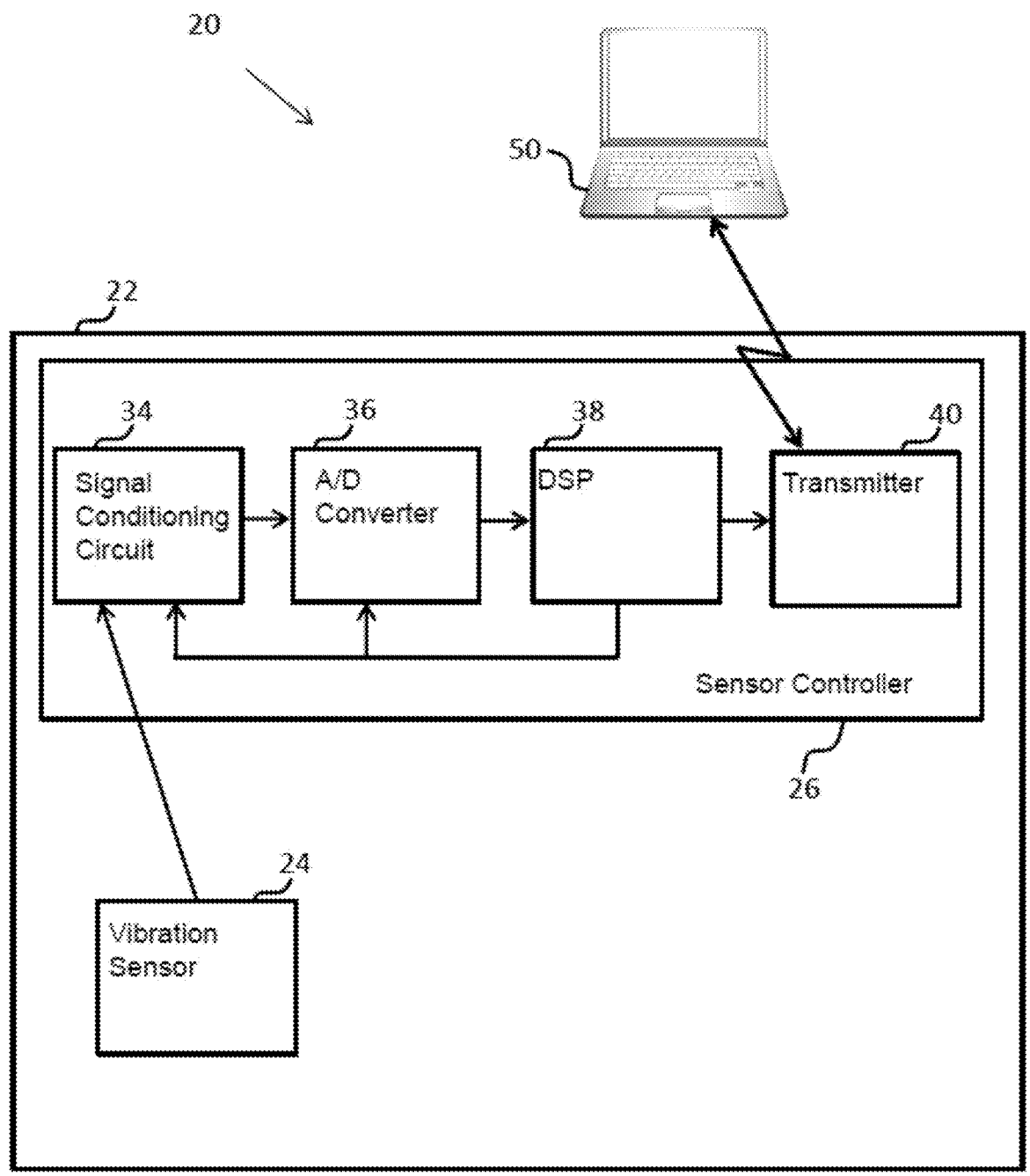
FIG. 1 is a schematic diagram of a system for detecting intrusion, according to some embodiments of the present invention.

FIG. 1 is a schematic diagram of a detection system 20 for detecting intrusion via underground intrusion detectors, according to some embodiments of the present invention. An intrusion detector 22 may be one of multiple similar intrusion detectors that may be buried around the perimeter of a restricted or protected area. Such an area is typically guarded or otherwise monitored for one or more types of intrusion, such as intrusion by a vehicle, a person, and/or an animal. The intrusion detector 22 is typically battery-powered. The power consumption of such an intrusion detector has a direct impact on how frequently batteries must be replaced, and therefore a direct impact on maintenance costs. Embodiments of the present invention provide methods and systems for reducing the power consumption and thereby reducing maintenance costs. The intrusion detector 30 includes one or more vibration sensors 24, also referred to hereinbelow as seismic sensors, which are typically motion-to-voltage transducers, such as piezoelectric sensors. For monitoring seismic signals indicative of intrusion, such sensors typically have an operating sensitivity to frequencies in a range of, for example, 7 Hz to 400 Hz.

The intrusion detector 22 also includes a battery and battery-powered processing elements that may be configured within a sensor controller 26. The sensor controller 26 may be detached from the vibration sensor 24, as described further hereinbelow with respect to FIGS. 3 and 4.

One or more signal conditioning circuits 34 are typically applied as front-end circuits of the sensor controller 26, in order to improve the signal-to-noise ratio (SNR) in the vibration sensor signals, filtering higher frequency noise while amplifying low frequency vibration signals. The signal conditioning circuit may include analog, low noise amplifier (LNA) circuits. The circuit may attenuate signals at frequencies above or below the frequency band of interest. Topologies of LNAs may include Open Loop Network (OLN), Capacitive Feedback Network (CFN), Miller Integrator Network (MIFN), or Fully Differential Difference Amplifier (FDDA). The output of the one or more signal conditioning filters 34 is typically input to an A/D converter 36, which digitizes the input signals and provides the digital output to a digital signal processor (DSP) 38.

The A/D converter has three key operating parameters that affect the power consumption and the sampling quality (SNR) or precision: the sampling resolution (e.g., 8, 12, 16 or 24 bits per sample), the over-sampling rate (OSR), and the sampling frequency.

In embodiments of the present invention, the DSP 38 is programmed to determine the likelihood that seismic signals indicate an intrusion, as described further hereinbelow with respect to FIG. 2. The process includes matching received seismic signals with signal patterns indicative of different types of intrusions (such as vehicle or human footsteps). Based on the type of intrusion, the DSP 38 may also determine additional features of the intrusion, such as a distance from the intrusion detection device to a source causing the seismic vibrations, as described further hereinbelow.

The precision of the A/D converter 36 may be programmable, such that parameters such as the sampling rate, resolution, and oversampling rate can be adjusted on-the-fly. As described hereinbelow, when the DSP 38 senses an indication of an intrusion, it changes the precision settings of the A/D converter 36 to provide higher precision sampling (higher sampling rate, resolution, and/or oversampling rate). The higher precision sampling also increases the power consumption of the A/D converter. Maintaining the lower precision sampling setting when vibrations are not detected reduces the average power consumption of the system.

When the DSP 38 determines that an intrusion may have occurred, it may send an intrusion alert signal, to be transmitted by a transmitter 40, to a remote alarm controller 50, thereby notifying operators of the possible intrusion. Transmitter 40 is typically a wireless transmitter. The remote alarm controller is typically a security system configured to notify security personnel and to log incidents.

Hereinbelow, the conditioning filters 34, the A/D converter 36, and the digital signal processor (DSP) 38 are collectively referred to as "the processor". Typically, these three elements are contained within a single microcontroller, such as an MCU C2000 manufactured by Texas Instruments.

Figure 2:
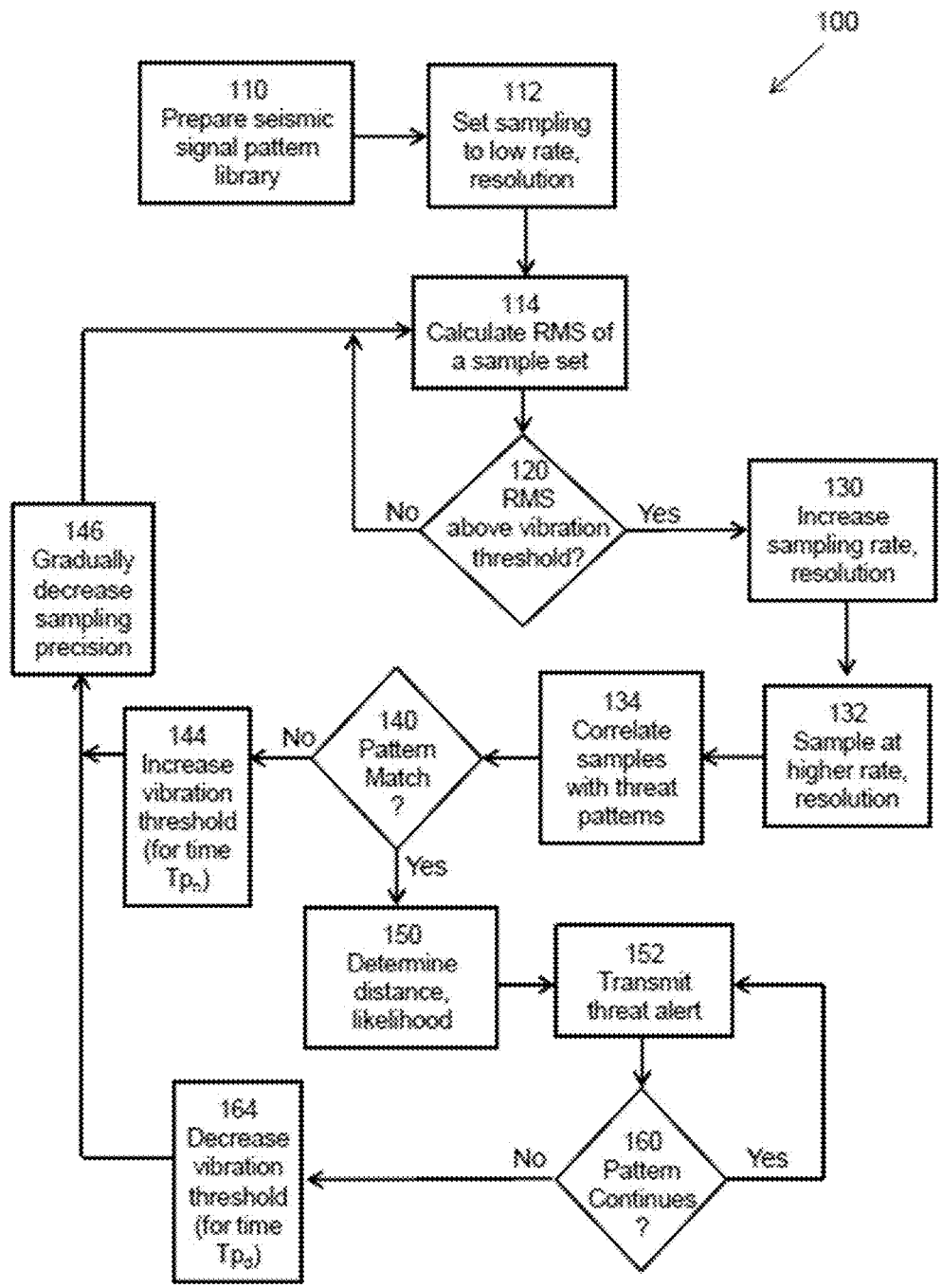
FIG. 2 is a flow diagram depicting a process of detecting intrusion, according to some embodiments of the present invention.

FIG. 2 is a flow diagram depicting a process 100 of detecting intrusion, according to some embodiments of the present invention. At an initial step 110, a signal pattern library (or alternative storage framework) may be stored in memory of the DSP, including patterns of seismic signal samples from known sources, such as human footsteps, vehicles, animals, or heavy equipment (e.g., construction equipment). The patterns are subsequently compared with new seismic signals recorded in real time during system operation, to determine if the new seismic signals correspond to known patterns.

At a step 112, vibration sensors 32 sense seismic signals, producing analog electric signals that are filtered by the signal conditioning circuits 34. The signal conditioning circuit output is sampled by the A/D converter 36 at a low precision setting, that is, at a low sampling rate and/or a low resolution. Oversampling, if performed, is also at a low rate. At the low precision setting, the A/D converter operates at a relatively low level of power consumption. Output of the A/D converter is then received by the DSP.

At a step 114, the DSP, after receiving a set of sampled signals, such as between 15 and 100 samples, calculates a vibration level of the received signals, the vibration level being a representative value of variability or volatility, such as a root-mean square (RMS) value or an average peak-to-peak deviation. At a step 120 the vibration level (a higher "vibration level" being indicative of larger vibrations) is compared with a pre-determined vibration threshold. If the level is not greater than the threshold (i.e., "no"), then the vibrations are not great enough to warrant further analysis, and sampling continues at the step 112.

A vibration level (e.g., RMS value) greater than the threshold (i.e., "yes") indicates there may be a source of the vibration that is not merely noise. Processing by the DSP continues at step 130, at which the DSP increases the precision settings of the A/D converter 36, by increasing one or more of the sampling rate, the resolution or the oversampling. At step 132, the A/D converter continues sampling signals from the signal conditioning filters 34, at the higher precision settings. An initial sampling at the higher precision may last for a predetermined amount of time, for example, between 5 and 30 seconds.

At a step 134, the DSP calculates correlations, that is, degrees of matching, between the sampled signals and pre-stored seismic patterns. The pre-stored seismic patterns are representative of seismic patterns generated by various possible vibration sources. In some embodiments, pre-stored seismic patterns may be defined as features of signals generated by different types of sources. Signal matching methods may include methods of Hidden Markov Models (HMM), frequency analysis, differential analysis, linear algebra, spectral distortion, and time distortion. Such methods typically generate values for a probability and an accuracy of a match. Features may also be extracted by a machine learning system, which may be based on classifiers such as the k-nearest neighbors algorithm (KNN), decision trees, or naive Bayes classifiers.

At a decision step 140, correlations between the sampled signals and the stored patterns are compared with a probability cutoff or threshold to determine if there is a "match," that is, a minimum correlation level, which means there is a reasonable likelihood of a target intruder (such as a human intruder or vehicle) being the cause of the sensed vibrations. If there is no match (at the cutoff probability) between any of the stored patterns and the sampled signals, processing continues at step 144, described further below. Otherwise, if there is a correlation, processing continues at step 150, at which parameters of the specific match are extracted. These parameters may include, for example, an estimate of a distance from the sensor to the source of the vibration. The likelihood of a correct match may also be extracted from the calculation of correlation.

At a step 152, the identification of a possible source of vibration may trigger an alarm, or other form of alert, notifying operators of the possible intrusion. The alert may include additional parameters, such as the type of source, the estimated position of the source (based on the estimated distance to the source), and an estimated likelihood of actual intrusion.

While steps 134-152 are performed, the input seismic signals continue to be sampled and tested by the processor (i.e., the A/D converter and acquired by the DSP) at step 132.

At a step 160, the DSP determines whether new seismic signals indicate a continued possible intrusion by the indicated threat. If the threat continues, the DSP may be configured to continue sending alerts (step 152), and/or to wait for the end of the threat (at which point an alert may be sent indicating that the source of vibrations is no longer detected.

When vibrations conforming to the originally identified pattern are no longer detected, step 164 may be performed, at which the DSP reduces the vibration threshold for a post-alarm time period $Tp_d$, in order to increase the sensitivity of the detection. A typical period of time may be 10 seconds. The vibration threshold is decreased (increasing sensitivity) after a likely intruder is no longer detected, given that the intruder may still be in the vicinity. Conversely, if no intrusion was detected at step 140 (i.e., there was no pattern match), the DSP may increase the vibration threshold for a post-event period of time ($Tp_n$), in order to decrease the sensitivity of the detection. That is, the vibration threshold is increased if an initial signal is determined to be merely noise, because the noise that triggered the initial analysis may still be present.

Whether there was a pattern match or not, the process typically continues at a step 146, at which the precision settings are returned to their original, low power level and the acquisition and testing of seismic signals continues. The return to a low power level may be gradual, as new vibrations are generally more likely to occur soon after a detection event, and a higher precision can permit a faster reaction to subsequent vibrations.

Figure 3:
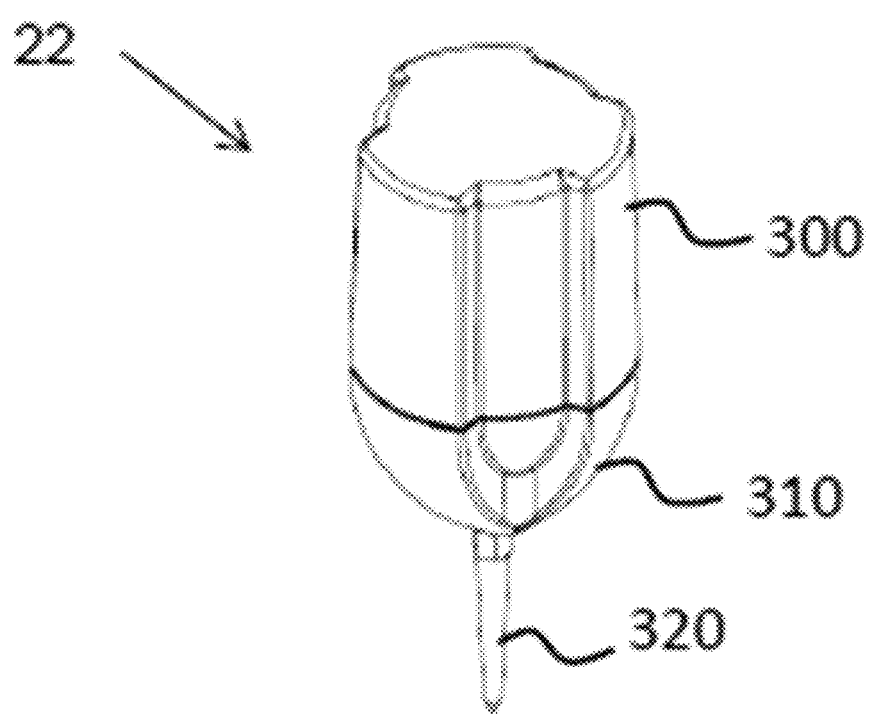
FIG. 3 is a schematic illustration of a buriable intrusion detector, according to some embodiments of the present invention; and, FIGS. 4 and 5 are schematic illustrations of separated parts of a buriable intrusion detector, according to some embodiments of the present invention.

FIG. 3 is a schematic illustration of the intrusion detector 22, according to some embodiments of the present invention. The sensor controller 26, described above with respect to FIG. 1, is contained within a top part 300 of the intrusion detector 22, and is affixed in a detachable manner (such as by pressure clips or screw threads) to a bottom part 310. The bottom part 310 includes the vibration sensor 24, described above with respect to FIG. 1. As described above, the sensor controller part typically includes processing elements (i.e., "a processor"), a transmitter, and a battery.

The bottom part 310 of the intrusion detector may also include a pin 320 for convenient positioning of the bottom part in the ground.

Figure 4:
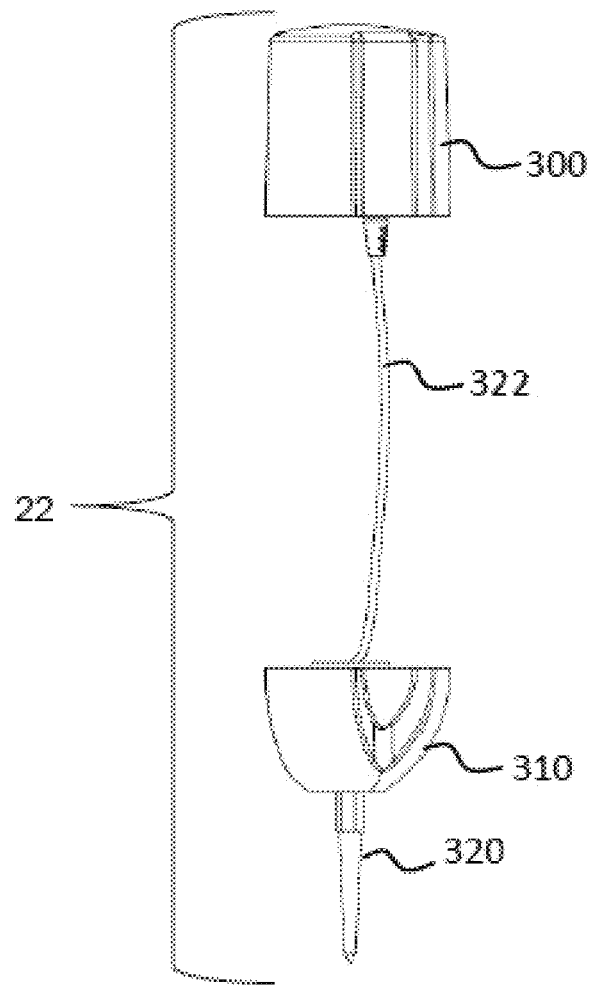
Figure 5:
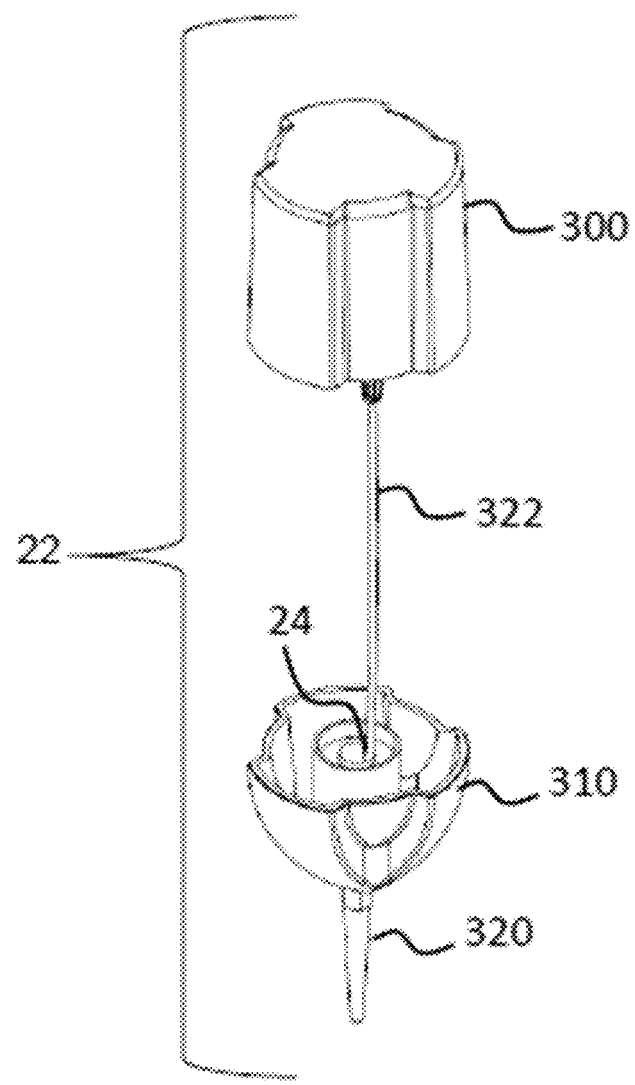

FIGS. 4 and 5 are schematic illustrations of separated parts of the intrusion detector 22, according to some embodiments of the present invention. FIG. 4 shows a direct view of the intrusion detector and FIG. 5 shows an isometric view.

As indicated in the figures, the intrusion detector 22 also includes an electrically conductive, insulated wire 322, which connects the vibration sensor to the processor, and over which signals from the vibration sensor are transmitted to the processor. The conductive wire is sufficiently long such that the top and bottom parts of the intrusion detector may be separated when buried.

When the top and bottom parts of the intrusion detector are attached together, they form a case that contains the conductive wire. When the first and second parts are separated, the two parts may be buried at different depths. The length of the conductive wire is preferably configured such that each part of the intrusion detector may be buried at an optimal depth, irrespective of the other part. Optimally, the vibration sensor 24 is buried at a relatively deep position in the ground, such as between 10 cm and 2 meters. As the depth increases, ground vibrations due to insignificant events, such as light rain, are muted. The top part 300, with the sensor controller 26, which includes the battery and the transmitter, is preferably buried close to the surface, for example between 5 cm and 10 cm deep. Burying the sensor controller close to the surface reduces the amount of attention that the earth imposes on wireless signals transmitted by the transmitter. As described above, when the processor determines that the seismic signals matches a seismic threat pattern, it transmits an intrusion alert to.

In addition, when the sensor controller is buried close to the surface, the elements of the sensor controller can be more easily accessed for maintenance. This is particularly significant with respect to the battery, which must be occasionally replaced. In some embodiments, the processing elements of the sensor controller can be disconnected from the sensor controller (i.e., from the other elements, including the conductive wire), for easy maintenance. The processor within the sensor controller 26 may be connected by a waterproof connector to the conductive wire 322, and may be detachable from the conductive wire 322 in order that it may be replaced with a new sensor controller if there is a device failure.

As described above, in some embodiments the intrusion detector 30 includes multiple vibration sensors 24, such that the bottom part may include multiple separable parts, each including an independent vibration sensor and a conductive wire 322 that attaches the independent vibration sensor to the sensor controller 26.

All or part of system 20 and of process 100 can be implemented in digital electronic circuitry, or in computer hardware, firmware, software, or in combinations thereof. A computing system configured to implement the system may have one or more processors and one or more network interface modules. Processors may be configured as a multi-processing or distributed processing system. Network interface modules may control the sending and receiving of data packets over networks. All or part of the system and process can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site or distributed across multiple sites. Memory storage may also include multiple distributed memory units, including one or more types of storage media. Examples of storage media include, but are not limited to, magnetic media, optical media, and integrated circuits such as read-only memory devices (ROM) and random-access memory (RAM).

It is to be understood that the invention and its application are not limited to the described above or the arrangement of the components set forth in the description or illustrated in the drawings, but are applicable to other embodiments that may be practiced or carried out in various ways. The scope of the present invention includes variations and modifications thereof which would occur to persons skilled in the art upon reading the foregoing description and which are not disclosed in the prior art. Method steps associated with the system and process can be rearranged and/or one or more such steps can be omitted to achieve the same, or similar, results to those described herein. Furthermore, it is to be understood that the phraseology and terminology employed herein is for the purpose of description and should not be regarded as limiting.

What is claimed:

1. A device for physical intrusion detection, comprising:
a vibration sensor,
a processor,
a transmitter,
a battery, and
a conductive wire connecting the vibration sensor and the processor,
wherein the vibration sensor is affixed to a first part of the device,
wherein the processor, transmitter, and battery are affixed to a second part of the device,
wherein the first and second parts, when attached together, form a case containing the conductive wire,
wherein according to a length of the conductive wire the first and second parts when separated are buriable at different depths, and
wherein the device further comprises a memory comprising computer-readable instructions that when executed by the processor cause the processor to perform steps of:
sampling a set of seismic signals from the vibration sensor;
determining that the set of seismic signals matches a seismic threat pattern; and
responsively transmitting, by the transmitter, an intrusion alert to a remote alarm controller.

2. The device of claim 1, wherein the conductive wire is between 10 cm and 2 meters in length.

3. The device of claim 1, further comprising additional vibration sensors, connected by additional respective conductive wires to the processor and affixed to additional, separable parts of the device.

4. The device of claim 1, wherein determining that the set of seismic signals matches the seismic threat pattern comprises determining that a vibration level is greater than a predetermined vibration threshold.

5. The device of claim 1, wherein sampling the set of seismic signals comprises sampling according to a first precision setting including parameters of a sampling frequency, a sampling resolution, and an oversampling rate.

6. The device of claim 1, wherein determining that the set of seismic signals matches the seismic threat pattern comprises performing steps of:

a. calculating a representative vibration level of the set of seismic signals;
b. determining that the vibration level is greater than a predetermined vibration threshold and responsively changing a first precision setting to a second precision setting by increasing at least one of: a sampling frequency, a sampling resolution, and an oversampling rate;
c. sampling, according to the second precision setting, a second set of seismic signals from the vibration sensor for a predetermined second sampling time period;
d. comparing the second set of seismic signals to one or more stored seismic threat patterns; and
e. responsively to determining a match between the second set of seismic signals and the one or more stored seismic threat patterns, issuing the intrusion alert.

7. The device of claim 6, wherein the processor is further configured, after issuing the intrusion alert, to determine that a subsequent set of seismic signals does not match the one or more of the stored seismic threat patterns and responsively to restore the first precision setting and to continue testing seismic signals.

8. The device of claim 7, wherein restoring the first precision setting after issuing the intrusion alert comprises decreasing the vibration threshold for a post-alarm time period.

9. A device for physical intrusion detection, comprising a vibration sensor, at least one processor, and a memory communicatively coupled to the at least one processor, the memory comprising computer-readable instructions that when executed by the at least one processor cause the at least one processor to perform steps of:
   a. sampling a first set of seismic signals from the vibration sensor, according to a first precision setting comprising parameters of a sampling frequency, a sampling resolution, and an oversampling rate;
   b. calculating a representative vibration level of the first set of seismic signals;
   c. determining that the vibration level is greater than a predetermined vibration threshold and responsively changing the first precision setting to a second precision setting by increasing at least one of the parameters of the sampling frequency, the sampling resolution, and the oversampling rate;
   d. sampling, according to the second precision setting, a second set of seismic signals from the vibration sensor for a predetermined second sampling time period;
   e. comparing the second set of seismic signals to one or more stored seismic threat patterns; and
   f. performing one of (1) issuing an intrusion alert, responsively to determining a correlation between the second set of seismic signals and the one or more stored seismic threat patterns, and (2) restoring the first precision setting and continuing to test seismic signals, responsively to determining no correlation.

10. The device according to claim 9, wherein comparing the second set of seismic signals to the one or more stored seismic threat patterns comprises filtering out noise from one or more of the seismic signals of the second set.

11. The device according to claim 9, wherein determining there is the correlation comprises determining a distance to a seismic vibration source, and issuing the intrusion alert comprises issuing an alert including a location and a probable intrusion.

12. The device according to claim 9, wherein determining there is the correlation comprises determining a correlation between the second set of seismic signals and each of the one or more stored seismic threat patterns and comparing each respective correlation with a preset probability threshold defining a minimum correlation for a match.

13. The device according to claim 9, wherein sampling the first set of seismic signals comprises sampling 15 to 100 samples and the second sampling time period is 5 to 30 seconds.

14. The device according to claim 9, further comprising, responsively to determining no correlation, increasing the vibration threshold for a post-event time period.

15. The device according to claim 9, further comprising, responsively to determining the correlation, decreasing the vibration threshold for a post-alarm time period.

16. The device according to claim 9, wherein calculating the vibration level comprises calculating a root mean square (RMS) value of the set of signals.

17. The device according to claim 9, wherein restoring the first precision setting comprises gradually decreasing, over a period of time, one or more of the precision setting parameters until the parameters equal to those of the first precision setting.

18. A method for detecting physical intrusion, implemented on at least one processor having at least one memory communicatively coupled to the at least one processor and comprising stored computer-readable instructions that when executed by the at least one processor cause the at least one processor to perform the method of:
   a. sampling a first set of seismic signals from a vibration sensor, according to a first precision setting comprising parameters of a sampling frequency, a sampling resolution, and an oversampling rate;
   b. calculating a representative vibration level of the first set of seismic signals;
   c. determining that the vibration level is greater than a predetermined vibration threshold and responsively changing the first precision setting to a second precision setting by increasing at least one of the parameters of the sampling frequency, the sampling resolution, and the oversampling rate;
   d. sampling, according to the second precision setting, a second set of seismic signals from the vibration sensor for a predetermined second sampling time period;
   e. comparing the second set of seismic signals to one or more stored seismic threat patterns; and
   f. performing one of (1) issuing an intrusion alert, responsively to determining a correlation, and (2) restoring the first precision setting and continuing to test seismic signals, responsively to determining no correlation.

* * * * *